United States Patent [19]
Picciallo

[11] Patent Number: 6,044,360
[45] Date of Patent: Mar. 28, 2000

[54] THIRD PARTY CREDIT CARD

[76] Inventor: Michael J. Picciallo, 50 Carlyle Dr., Bayville, N.J. 08721

[21] Appl. No.: 08/876,929

[22] Filed: Jun. 16, 1997

Related U.S. Application Data

[63] Continuation-in-part of application No. 08/585,173, Apr. 16, 1996, abandoned.

[51] Int. Cl.$^7$ .................................................... G06F 16/15
[52] U.S. Cl. ............................ 705/21; 235/380; 235/487
[58] Field of Search .................................... 235/380, 487; 705/21

[56] References Cited

U.S. PATENT DOCUMENTS

| | | | |
|---|---|---|---|
| 4,454,414 | 6/1984 | Benton | 235/379 |
| 4,654,793 | 3/1987 | Elrod | 364/401 |
| 4,725,719 | 2/1988 | Oncken et al. | 235/487 |
| 4,837,422 | 6/1989 | Dethloff et al. | 235/380 |
| 4,859,837 | 8/1989 | Halpern | 235/380 |
| 4,887,950 | 12/1989 | Halpern | 235/487 |
| 4,906,828 | 3/1990 | Halpern | 235/379 |
| 5,287,269 | 2/1994 | Dorrough et al. | 364/408 |
| 5,321,241 | 6/1994 | Craine | 235/380 |
| 5,350,906 | 9/1994 | Brody et al. | 235/379 |
| 5,408,082 | 4/1995 | Takagi et al. | 235/492 |
| 5,530,232 | 6/1996 | Taylor | 235/380 |
| 5,559,313 | 9/1996 | Claus et al. | 235/380 |
| 5,566,327 | 10/1996 | Sehr | 395/600 |
| 5,578,808 | 11/1996 | Taylor | 235/380 |
| 5,581,663 | 12/1996 | Zlotin et al. | 395/51 |

OTHER PUBLICATIONS http://www.fus.edu/~fstime/FS–Times/Volume 1/Issue 3/President.html; "A Message from the President—FSU Smart Card eases campus life here and around the country"; posted Apr./May 1996.
http://www.itc.icl.ie/products/smartcard/ems/fsucase.htm; "Florida State University"; posted Sep. 1996.
http://www.fsu.edu/~fstime/FS–Times/Volume 1/Issue 6/compression.html; Compression—Short Takes on Bog Subjects (Smart card marches on); posted Sep. 1996.
http://www.house.gov/castle/banking/norwood3.htm; "Florida State University fI,900 FSUCard: A Multipurpose Identification Card"; Bill R. Norwood; posted Jul. 10, 1996.
http://www.admissions.fsu.edu/notes/nole3/not–008.htm; "Smart Card—FSU Thinks Smart"; posted Sep. 1996.

(List continued on next page.)

*Primary Examiner*—Harold I. Pitts
*Attorney, Agent, or Firm*—Synnestvedt & Lechner LLP

[57] ABSTRACT

A system for allocating funds in pre-established customer accounts including:
  a controller processor programmed: (a) to process data, (b) to create for each customer a customer account file, and (c) to transfer funds from customer account files to transferees selected by said customers, in response to command instructions;
  an input device for supplying command instructions to said controller processor; and
  a data storage device associated with said controller processor in which file records of said customer account files created by said controller processor are stored, including information on the amounts of funds deposited for said customers;
  wherein said controller processor is programmed (a) to process and store information in said storage device for each customer account, in response to command instruction from find depositors, limiting the amount of funds that may be spent on particular classes of goods and services; and (b) to process fund transfer command instructions issued by said customers by determining whether the requested finds exceed the limit set for said goods or services to be purchased.

A computer-based method for allocating funds in this manner is also disclosed.

38 Claims, 2 Drawing Sheets

OTHER PUBLICATIONS http:www.floridaflambeau.com/Int . . . issues/1997/021897/news1.this. html; "This year the War Department aims for fairer FSU Card fees"; Riva Saker; posted Feb. 12, 1997.

http://www8.zdnet.com/pcweek/news/0324/24smart.html; "Smart cards move to head of class"; Scott Berinato; posted Mar. 24, 1997.

http:www.floridaflambeau.com/Int . . . 199704259news2.technology.html; "The future of technology could find roots in Tallahassee, FSU"; Rachael Knowles; posted Apr. 25, 1997.

"New Web Site Enables Teens and Kids to Shop and Save Online," *Business Wire* (Jan. 26, 1999).

http://www.RocketCash.com/overview/html, Dec. 1998.

THIRD PARTY CREDIT CARD

CROSS-REFERENCE TO RELATED APPLICATION

This application is a Continuation-In-Part of U.S. patent application Ser. No. 08/585,173 filed Apr. 16, 1996, now abandoned, the disclosure of which is incorporated herein by reference thereto.

BACKGROUND OF THE INVENTION

The present invention relates to systems for transferring funds, such as periodic allowance payments, by an account holder from a preestablished account to a third party recipient for the funds designated by the account holder. In particular, the present invention relates to systems for transferring funds in which the account holder is provided with a periodic statement itemizing how the funds are spent by the third party recipient.

ATM and debit card systems have gained wide acceptance as means for performing currency transactions. In addition to providing the ability to withdraw cash from a bank account or a credit card line, it is now possible to pay for a point-of-sale transaction with an electronic funds transfer. The computer networks that support ATM and debit card systems make it possible to design transactions that go beyond the conventional exchange of cash for goods or services.

For example, U.S. Pat. No. 5,287,269 discloses a system that uses a card similar to a debit card to control access within a recreational facility such as an amusement park. The card replaces the tickets or tokens conventionally used to control access to amusement rides and arcade games Thus, a parent may provide a child with a pre-paid card encoded with sufficient credit to ensure an enjoyable day of entertainment.

U.S. Pat. No. 5,321,241 discloses a system that uses a card similar to a debit card to track the spending of casino promotional funds by individual gamblers. The purpose of the card is to prevent gamblers from spending promotional funds on food, or even in other casinos, and to ensure that the promotional funds are only spent on gambling within the issuing casino.

U.S. Pat. No. 5,350,906 discloses a debit card system in which funds may be electronically transferred by an account holder to a third party recipient by the issuance of a fixed currency limit debit card to the recipient at his or her location. One advantage to this system is that the recipient need not have a preestablished ATM or debit card account with the issuing bank or other institution. The system may be used by parents to issue periodic allowance payments or spending money, for example, to a son or daughter away at college in a distant city.

In each of the foregoing systems, however, the funds transferor is not provided with control over how the money is spent by the transferee, or provided with an accounting thereafter. For example, the parent who buys their child the pre-paid card for amusement park access of U.S. Pat. No. 5,287,269 has no way of preventing the child from spending the entire card on video games and cotton candy, or of even knowing later whether this has happened.

The casino issuing the card of U.S. Pat. No. 5,321,241 may be willing to allow a portion of the funds to be spent on food or lodging if a limit could be established, and if it could later know how much money was actually spent on gambling. It would also be useful for the casino to know how the money was actually gambled for purposes of including a gambler on more specific future promotions, such as a slot machine promotion or a black jack promotion.

A parent issuing the fixed currency limit debit card of U.S. Pat. No. 5,350,906 to a son or daughter away at college has no way to ensure that most of the funds are spent at the college bookstore and not withdrawn as cash or spent on rounds of drinks at the local pub. There is no way for the parent to know how the money was actually spent.

A need exists for a system in which an account holder may electronically transfer funds from a preestablished account to a third party recipient with limits set on how the money may be spent and then receive a subsequent accounting of how the money was actually spent.

SUMMARY OF THE INVENTION

This need is met by the present invention. It is an object of the present invention to provide a system and a computer-based method in which account holders may transfer funds from preestablished accounts to third party recipients and then receive an itemized statement of how the recipients spent the funds.

Another object of the invention is to provide a system and a computer-based method in which account holders may transfer funds from preestablished accounts to third party recipients and set limits on the goods or services for which the funds are spent, or on the amounts which may be spent for certain goods or services.

Therefore, according to one aspect of the present invention, a system is provided for use in transferring funds from preestablished accounts by account holders to third party recipients, including:

controller processor for processing data according to command instructions and for creating customer account files, the controller processor having a data storage device associated therewith for storing file records of the amounts of funds deposited by the account holders in the preestablished accounts, each file containing a primary file into which the amount of funds deposited is recorded, and a secondary file into which at least a portion of the amount of the deposited funds may be transferred and recorded by the controller processor in response to command instructions issued by the account holder, wherein the amount of the funds transferred to the secondary file may be electronically transferred by the controller processor to payees selected by the third party recipients in response to command instructions issued by the third party recipients, and wherein the system further includes a data storage device associated with the controller processor for storing file records of information on each selected payee of funds from the secondary file and the corresponding payment amount;

at least one input device for supplying to the controller processor command instructions from the account holders and third party recipients; and an output device for periodically supplying to each account holder the file record containing information on each selected payee of funds and corresponding payment amounts.

Preferred systems in accordance with this aspect of the present invention also permit account holders to exclude certain fund transfer payees designated individually or by the type of establishment, or to establish periodic transaction limits by the single transaction, day, week, month or so forth. In the preferred systems, the controller processor is adapted to process command instructions from the account holder to store in the data storage device associated therewith information on electronic fund transfer payees subject to periodic limits on the amount of funds that may be transferred, and to inquire into each electronic fund transfer command instruction issued by the third party recipient to determine whether the payee is subject to a transaction limit below the transfer amount requested, with the controller processor being adapted to complete the electronic fund transfer when the payee is not subject to a transaction limit below the amount requested, and to discontinue the electronic fund transfer when the payee is subject to a transaction limit below the amount requested.

The system of the present invention contemplates that the third party recipients designated by account holders will be issued magnetic cards to access the funds that have been set aside on their behalf. The recipients can then withdraw the funds as cash from ATM machines, or pay for point-of-sale purchases of goods and services by electronic fund transfer. At the same time, the account holder may limit how much of the funds that have been set aside may be withdrawn as cash, or even block this entirely, with the set-aside funds only being accessible by electronic funds transfer.

Accordingly, preferred systems in accordance with the present invention will further include a magnetic card encoded with an identifier correlated to the secondary file of the preestablished account and issued to the third party recipient. When the magnetic card is issued to the son or daughter of an account holder to access funds set aside as an allowance payment, the card, in effect, becomes an allowance card. Under such circumstances, the account holder may arrange for the transfer of funds weekly or monthly from the primary file of the preestablished account to the secondary file as a form of an allowance payment.

Thus, parents making allowance payments to a son or a daughter using the system of the present invention may limit the amount of the payment that may be withdrawn from ATM machines as cash. And, because banking and credit card institutions have already created an identification system with electronic fund transfer networks categorizing payees by the types of goods or services they provide, limits can be placed on the amount that is spent in restaurants daily, weekly or monthly using a debit card, and spending in pubs or taverns could be prohibited entirely. When ATM cash withdrawals are also blocked, spending of an allowance budget on alcohol or tobacco may be effectively blocked by a parent. At the same time, unlimited spending could be permitted, for example, at computer software stores, or at a college book store.

Similarly, a casino issuing promotional funds using the system of the present invention may limit the amount of funds that are spent on food, lodging or particular games of chance. At the same time, unlimited spending on, for example, slot machines, could be permitted.

But the primary advantage of the present invention is that an itemized statement is issued to the account holder periodically, i.e., weekly or monthly, providing an accounting of how the set aside funds were spent. In the situation of a parent making an allowance payment, a statement would be sent, similar to a bank or credit card statement, listing ATM cash withdrawals, as well as electronic fund transfer payees. A precise accounting would be provided of how much of each allowance payment was withdrawn as cash, how much was spent in identified restaurants, and how much was spent on school supplies.

Nevertheless, the present invention also includes systems in which such an accounting is not provided, with the primary advantage being the ability to limit electronic fund transfer payments to certain payees. According to this aspect of the present invention, a system is provided for use in transferring funds from preestablished accounts by account holders to third party recipients, including:

controller processor for processing data according to command instructions and for creating customer account files, the controller processor having a data storage device associated therewith for storing file records of the amounts of funds deposited by the account holders in the preestablished accounts, each file containing a primary file into which the amount of funds deposited is recorded, and a secondary file into which at least a portion of the amount of the deposited funds may be transferred and recorded by the controller processor in response to command instructions issued by the account holder, wherein the amount of the funds transferred to the secondary file may be electronically transferred by the controller processor to payees selected by the third party recipients in response to command instructions issued by the third party recipients, and wherein the system further includes a data storage device associated with the controller processor for storing file records of information on each selected payee of funds from the secondary file and the corresponding payment amount and wherein the controller processor is adapted to process command instructions from the account holder to store in the data storage device associated therewith information on electronic fund transfer payees subject to periodic limits on the amount of funds that may be transferred; and at least one input device for supplying to the controller processor command instructions from the account holders and third party recipients;

wherein the controller processor is adapted to inquire into each electronic fund transfer command instruction issued by the third party recipient to determine whether the payee is subject to a transaction limit below the transfer amount requested, to complete the electronic fund transfer when the payee is not subject to a transaction limit below the amount requested, and to discontinue the electronic fund transfer when the payee is subject to a transaction limit below the amount requested.

The present invention also includes systems in which the account holder is also essentially the "bank," such as, for example, when a casino issues promotional funds to a gambler but restricts how such funds may be used. According to this aspect of the present invention, a system is provided for providing promotional funds for use by customers, including:

controller processor for processing data according to command instructions and for creating customer account files, the controller processor having a data storage device associated therewith for storing file records of the amounts of funds issued to customers, wherein the promotional funds may be electronically transferred by the controller processor to payees selected by the customers in response to command instructions issued by the customers, and wherein the system further includes a data storage device associated with the controller processor for storing file records of information on each selected payee of funds and the corresponding payment amount and wherein the controller processor is adapted to process command instructions to store in the data storage device associated therewith information for each customer on electronic fund transfer payees subject to periodic limits on the amount of funds that may be transferred; and at least one input devices for supplying to the controller processor command instructions from customers;

wherein the controller processor is adapted to inquire into each electronic fund transfer command instruction issued by customers to determine whether the payee is subject to a transaction limit below the transfer amount requested, to complete the electronic fund transfer when the payee is not subject to a transaction limit below the amount requested, and to discontinue the electronic fund transfer when the payee is subject to a transaction limit below the amount requested.

In the example of the casino given above, payees selected by customers may include a casino restaurant, hotel, souvenir shop, slot machine, black jack table, and the like. The system of the present invention permits a casino to retain control over how promotional funds given to a customer are allocated and spent.

According to another aspect of the present invention, computer-based methods for operating the systems of the present invention are provided. Methods in accordance with this aspect of the present invention include the steps of:

creating a customer account file including a primary file containing a record of funds deposited by an account holder;

establishing a secondary file in the customer account file in response to command instructions from the account holder;

designating a third party recipient permitted access to the secondary file in response to command instructions from the account holder;

transferring to the secondary file in response to command instructions from the account holder at least a portion of the record of funds contained in the primary file representing deposited funds accessible to the third party recipient;

storing a file record of information on every electronic fund transfer executed by the third party recipient from the secondary file, including information on the transfer payee and the corresponding payment amount; and providing periodically to the account holder an itemized statement generated from the file record of executed electronic fund transfers from the secondary file.

Preferred methods according to this embodiment of the invention provide for the establishment of limits in the amounts of transactions. Such preferred methods further include the steps of designating in response to command instructions from the account holder, payees of funds to be withdrawn by third party recipient subject to a limit on the amount of funds that may be withdrawn, and verifying each withdrawal from the secondary file requested by the third party recipient to determine whether it is subject to a limit in the amount of the transaction, and whether that limit has been exceeded. The method will further include the step sending a disapproval signal if there is a limit that is exceeded, and may optionally include the step of sending an approval signal if there is no limit, or if there is a limit that has not been exceeded.

This aspect of the present invention also includes methods which provide for the establishment of limits in the amounts of transactions without generating an itemized statement to the account holder of withdrawals by the third party recipient. Methods according to this embodiment of the invention include the steps of:

creating a customer account file including a primary file containing a record of funds deposited by an account holder;

establishing a secondary file in the customer account file in response to command instructions from the account holder;

designating a third party recipient permitted access to the secondary file in response to command instructions from the account holder;

transferring to the secondary file in response to command instructions from the account holder at least a portion of the record of funds contained in the primary file representing deposited funds accessible to the third party recipient;

designating in response to command instructions from the account holder, payees of funds to be withdrawn by third party recipient subject to a limit on the amount of funds that may be withdrawn; and verifying each withdrawal from the secondary file requested by the third party recipient to determine whether it is subject to a limit in the amount of the transaction, and whether that limit has been exceeded.

This method will also further include the step sending a disapproval signal if there is a limit that is exceeded, and may optionally include the step of sending an approval signal if there is no limit, or if there is a limit that has not been exceeded.

This aspect of the present invention will also include computer-based methods in which the account holder essentially functions as a "bank." Methods in accordance with this aspect of the present invention will include the steps of:

providing a customer account file containing a record of funds issued to customers;

designating payees of funds to be withdrawn by customers subject to a limit on the amount of funds that may be withdrawn; and verifying each withdrawal from the customer account file requested by customers to determine whether it is subject to a limit in the amount of the transaction, and whether that limit has been exceeded.

This method will also further include the step sending a disapproval signal if there is a limit that is exceeded, and may optionally include the step of sending an approval signal if there is no limit, or if there is a limit that has not been exceeded.

The system of the present invention is not limited to preestablished currency accounts at banking institutions, but also includes credit accounts, within which the account holders may establish a sub-line of credit that may be drawn against by a third party recipient. Thus, for purposes of the present invention, the term "funds" is defined as including credit lines extended to account holders and third party recipients, as well as currency deposited by account holders, The account holder may require the third party recipient to repay the drawn credit, and the account may thus be employed to control a young person's use of credit, but at the same time teach them how to use the credit responsibly.

The system of the present invention thus provides a tool for a wage earner to provide spending money to a dependent, and at the same time teach the dependent how to budget their money and manage cash flow, while maintaining some control over how the money is spent. Initially, the permits on the types of purchases may be employed as guidance with respect the appropriateness of purchases, and to discipline the dependent to control their spending habits.

Other features of the present invention will be pointed out in the following description and claims, which disclose the principles of the resent invention and the best modes which are presently contemplated for carrying them out.

DETAILED DESCRIPTION OF THE PREFERRED EMBODIMENT

Figure 1:
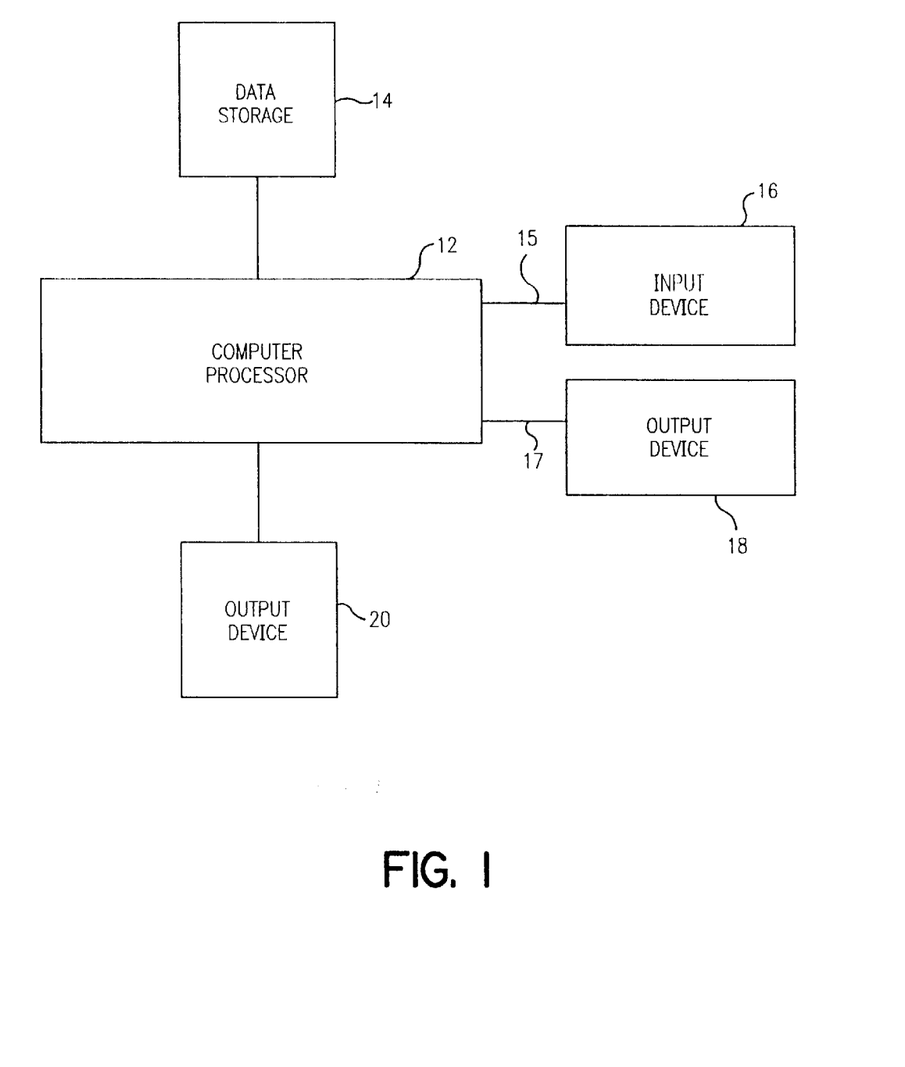
FIG. 1 is a block diagram of the representative system hardware of the present invention.

Referring now to the drawings, and initially FIG. 1, the system of the present invention is comprised of a computer processor 12, herein referred to as a controller processor, coupled to a data storage device 14 such as a memory device and in communication through phone line 15 with at least one input device 16 through which fund transfer command instructions are received and through phone line 17 with at least one output device 18 through which electronic fund transfers are executed. The embodiment depicted in FIG. 1 also includes output device 20 for generating a file record containing information on electronic fund transfer payees, which is described in greater detail hereinafter.

The system may be a local, entirely self-contained internal network of input and output devices under the absolute control of the system operator, as would be the case when the system is employed by a casino or an amusement park. Alternatively, the system may be in communication with an external network of input and output devices, such as a banking, credit or ATM network.

The controller processor of the present invention can be essentially any mainframe computer processor or plurality of processors, or any computer workstation capable of interfacing with the network to be employed and executing the volume of command instructions supplied by the network. The control programs to be run by the controller processor for operating the system of the present invention are essentially conventional, once the objectives of the present invention are described.

The data storage devices associated with the controller processor can be essentially any conventional memory storage device, typically a semi-conductor memory in combination with a hard disk drive or a CD-ROM drive with a compact disk. The memory device is employed to store information on the preestablished accounts from which account holders transfer funds to third party recipients. It will be assumed for purposes of the present invention that the system operators have methods of establishing accounts and placing money or establishing credit lines within these accounts and that proper accounting procedures are in place to track the various transactions, all of which are standard in the industry and well known to those skilled in the art.

For local self-contained systems, the controller processor is in communication with the internal network of input and output devices through cables or telecommunication lines. When the system is in communication with an external network, telecommunication lines are nearly exclusively employed.

Essentially any input device capable of supplying command instructions to the controller processor from account holders and third party recipients is suitable for use as an input device for the present invention. For purposes of the present invention, command instructions will be considered to be issued by an account holder or a third party recipient if the instructions are issued by another individual on their behalf. For example, a bank employee may issue command instructions requested by an account holder to transfer funds for access by the third party recipient. A store employee may issue command instructions requested by the third party recipient to obtain an electronic fund transfer to pay for goods and services in a point-of-sale purchase.

External banking, credit and ATM networks have already been established using as combination input/output devices stations that employ magnetic card readers in combination with manual input devices such as keypads, touch screens and the like, through which information required for the transaction may be entered, such as the transaction amount, account password, and so forth. One example of such a station is an ATM. Another example is the magnetic card reader/keypad employed for point-of-sale transactions to obtain bank approval of credit card and debit card transactions. Such stations also serve as output devices for the systems that they serve. The ATM is adapted to deliver cash, print a receipt and relay messages from the network processor via a CRT. The magnetic card reader relays messages from the network processor via an LCD, and is also adapted to print a receipt. When the system of the present invention is adapted to communicate with such an external network, the fund transfer command instructions may be issued by the third party recipients through such input devices, which will also function as output devices for the system, delivering cash, relaying messages from the controller processor and printing receipts.

Otherwise, essentially any conventional manual input device may be employed, particularly with local, internally self-contained systems in accordance with the present invention. Such devices include keypads, touch screens, mouse and cursor systems, and the like. It is not essential that magnetically encoded cards and magnetic card readers be employed.

Likewise, any device capable of relaying messages from the controller processor to the account holder or third party recipient is also suitable for use as an output device with systems of the present invention. Examples of devices include CRT's, LCD's, printers, and the like. In the simplest of local, internally self-contained systems, the machine vending of cash and printing of receipts is not contemplated. Instead, an employee of the system operator would attend to such tasks, receiving prompts from the controller processor through an output display device.

A particular advantage of the present invention is that the account holder is provided with a periodic accounting of how the third party recipient of funds has spent the money accessible to them This would be in the form of a statement issued daily, weekly, monthly, and the like, detailing cash withdrawals and debit card transfers. This is also performed by essentially routine simple means ranging from e-mail to desktop publishing, or as complex as the systems employed by banking and credit institution for generating periodic statements for conventional accounts. Such means are very well known and require no description here.

As noted above, it is not necessary that the system of the present invention employ magnetically encoded cards to provide system access to account holders and third party recipients. Instead, access to the system may be obtained through the entry of the requisite information by way of a manual input device, such as a keyboard, that is in communication with the system. The information may be entered directly by the account holder or third party recipient, or on their behalf by an employee of the system operator or fund transfer payee.

However, the use of magnetic cards encoded with account information is particularly preferred for the sake of convenience. The cards also eliminate the need for the system operator to hire employees to receive and enter information that would be submitted directly to the system by the account holder or third party recipient. In other words, it is more economical for a bank to permit a third party recipient to access cash via an ATM, rather that require the recipient to present themselves to a bank teller. Magnetic cards issued to third party recipients will be encoded with an identifier correlated to the secondary file of the preestablished account. The encoding of information fields on the magnetic stripe of a magnetic card is well known and essentially conventional and also need not be described here.

Figure 2:
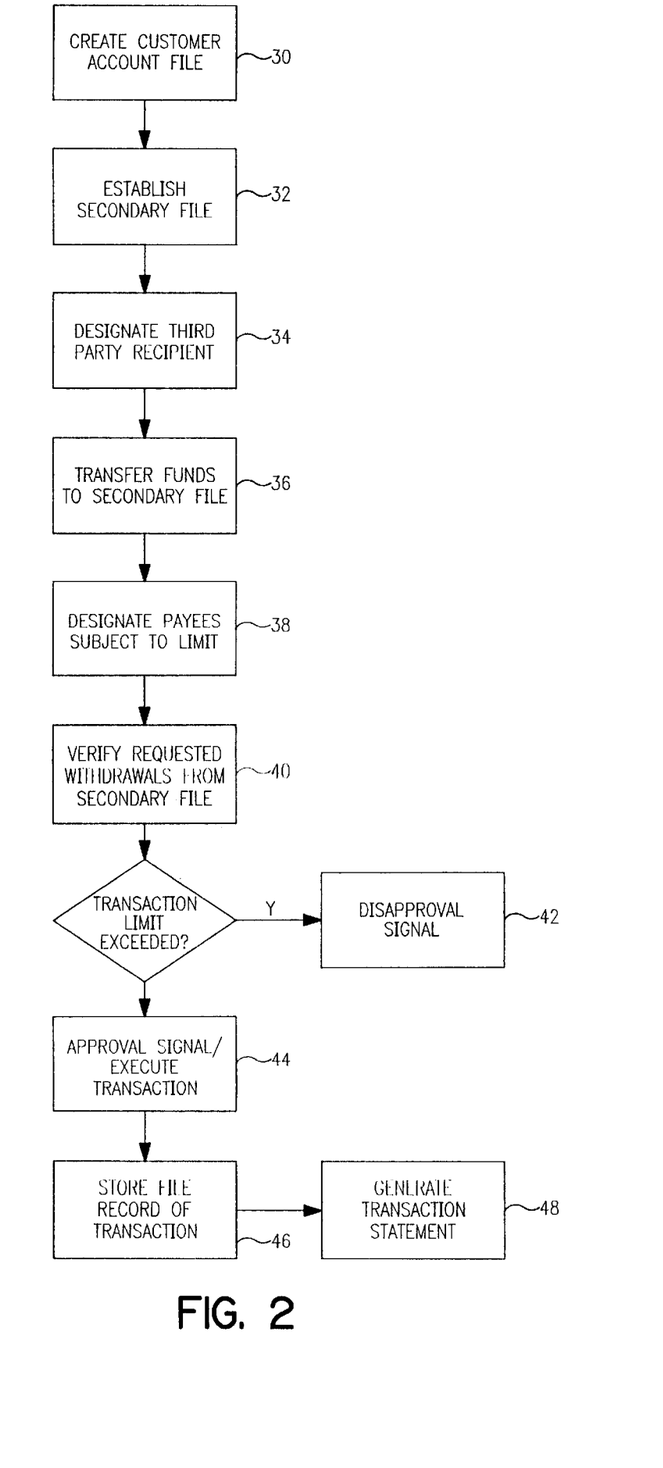
FIG. 2 is a flow chart showing the operation of the system of the present invention.

Turning now to FIG. 2, there is illustrated in block diagram form the computer-based method of the present invention, that shall be discussed with reference to the system depicted in FIG. 1. Typically, the computer processor 12 creates in memory device 14 associated therewith customer account file 30 containing a record of funds deposited by the account holder. The account holder inputs command instructions 32 input device 16, typically a computer terminal or work station, which are transmitted by telephone lines 15 to computer processor 12 to establish a secondary file in the customer account. The account customer then inputs command instructions 34, usually contemporaneously with the establishment of the secondary file using the same input device, to designate a third party recipient permitted access to the secondary file. Alternatively, the third party recipient can be designated at a later time from the same or different input device.

The account customer then inputs command instructions 36 to transfer to the secondary file at least a portion of the record of funds contained in the primary file representing deposited funds accessible to the third party recipient. Again, this is usually done contemporaneously with the establishment of the secondary file and the designation of a third party recipient using the same input device. However, this step can also be performed at a later time from the same or different input device.

In the embodiment illustrated in FIG. 2, the account customer inputs command instructions 38 to designate payees of funds to be withdrawn by the third party recipient subject to a limit on the amount of funds that may be withdrawn. Again, this may be done contemporaneously with the establishment of the secondary file, the designation of the third party recipient and the transfer of funds from the primary file using the same input device, or this step may be performed at a different time using the same or different input device.

The computer processor 12 then verifies each withdrawal from the secondary file requested by the third party recipient 40 to determine whether it is subject to a limit in the amount of the transaction, and whether that limit has been exceeded. At the same time, the computer processor verifies that there are funds available in the secondary file to complete the transaction (not shown). The computer processor 12 sends a disapproval signal 42 if there is a transaction limit that has been exceeded, or an approval signal 44 if there is no transaction limit or if there is a transaction limit that has not been exceeded, along telephone lines 17 to output device 18. The approval or disapproval signal is also conditioned on the availability of funds in the secondary file (not shown). Typically output device 18 is part of a computer terminal or workstation that also includes an input device (not shown) through which third party recipients input electronic fund transfer requests.

The computer processor 12 also stores in memory device 14 associated therewith a file record of information 46 on each selected payee of funds and corresponding payment amounts. Periodically, the computer processor 12 provides to the account holder 48 the file record of information on fund payees and corresponding payment amounts in the form of an itemized statement generated by output device 20, typically a high volume printer.

To illustrate the inventive concept, the system of the present invention and the computer-based method by which it is implemented will be described with reference to a banking institution. The invention, however, is not limited to such applications, and those of ordinary skill in the art will understand how this concept can be extended to other end uses in which a business customer wants to extend spending credit to a third party, but control how the credit is spent and receive an itemized statement of the spending. Furthermore, while the system and method are being described with reference to a banking institution, it will also be understood by those of ordinary skill in the art that the system and method of the present invention may be employed equally as well with similar accounts offered by credit unions, stock brokerages, lending institutions and insurance companies.

In particular, an account holder preestablishes an account with a bank, into which he deposits funds, at least a portion of which are to be set aside for a third party recipient. The data processing system of the bank stores the account information, as well as the information on the funds deposited in the memory of the system. The data processing system is programmed to set up the account with a primary file into which the funds are initially deposited, and the capability to create one or more secondary files into which all or some of the deposited funds may be transferred for access by a third party recipient.

At any time thereafter, the account holder may issue command instructions to the data processing system to create a secondary file. More than one secondary file may be created, if the account holder wants to designate more than one fund recipient. The command instruction may be issued by the account holder, or by a bank employee on behalf of the account holder, from a computer terminal at a bank branch. Alternatively, if the bank is equipped to allow customers to bank at home using their home personal computer, then this transaction can be handled in this manner as well. As another alternative, the bank can program its ATM machines to serve as data input devices for this function as well.

The account customer provides the bank data processing system, which serves as the controller processor of the system of the present invention, with identifying information on the third party recipient for use in allowing the recipient access to the secondary file established on their behalf. The amount of funds to be transferred is also specified. The transfer can be established as a one time only event, or it can be programmed to occur periodically, i.e., daily, weekly, monthly, and the like. The periodic transfer can be programmed to occur automatically, or it can be programmed to occur only upon entry of a command instruction by the account holder. When periodic transfers are programmed, it will eventually be necessary for the account holder either to stop the transfers when the funds in the primary file of the account are depleted, or to replenish the funds in the primary file with additional deposits.

In a preferred embodiment of the invention, the account customer may, at the time a secondary file is created, or at any time thereafter, issue command instructions programming the data processing system to place limits on the amount of cash withdrawals or debit card purchases by the third party recipient. The account holder may set for the third party recipient, for example, a daily, weekly or monthly limit on the amount of cash withdrawals and/or debit card transactions. The account holder may want to block cash withdrawals entirely and only permit the third party recipient to withdraw funds from the secondary file through debit card transactions to obtain a more detailed accounting of how the money was spent. To block cash withdrawals, the account holder would specify $0 as the transaction limit for this type of transaction.

The account holder may also limit the amount of debit card transactions for specific classes of goods and services. Banking and credit card institutions have already encoded merchants and service providers with this information for billing purposes, so that it would not be difficult to similarly encode an approval request in a debit card point-of-sale transaction. Thus, an account holder may specify a limit on the amount of debit card transactions in bars and restaurants, for example. An absolute limit of $0 may be set, or the limit may be a daily, weekly or monthly dollar amount. The data processing system would then be programmed to evaluate each requested transaction to determine if a limit has been set, and whether the requested transaction exceeds any set limit. If there is no limit, or if the limit is not exceeded, an approval signal is sent to the merchant or service provider. If a limit exists that is exceeded, a signal is sent disapproving the transaction.

The data processing system is also programmed to evaluate the transaction request for fund availability, and to debit the secondary file after each transaction is executed. Subsequent transactions are then evaluated against the lowered account balance.

A magnetic card encoded with an identifier correlated to the secondary file is then issued. The encoding of magnetic cards is essentially conventional and will not be described in detail here. The card may be issued to the account holder for delivery to the third party recipient, or it may be issued directly to the third party recipient.

The third party recipient then uses the card like any other ATM or debit card to obtain cash from ATM machines, unless this feature has been blocked, and to obtain goods and services from merchants and service providers. And like any other ATM or debit card transaction, each requested transaction is submitted to the bank's data processing system for approval. However, with the system of the present invention, the transaction is evaluated for possible limits on the amount of the specific transaction, and an approval or disapproval signal is sent accordingly.

The account holder is provided with a summary of the ATM and debit card withdrawals made by the third party recipient as part of his or her monthly bank statement. The merchant or service provider is identified for each debit card transaction, in addition to the date and the amount of each transaction.

To illustrate another embodiment of the inventive concept, the system of the present invention and the computer-based method by which it is implemented will be described with reference to a casino issuing promotional funds to a gambling customer. The casino management preestablishes a customer account file, into which promotional funds are deposited. The data processing system of the casino stores the account information, as well as information on the promotional funds deposited in the memory of the system.

The casino management at this time, or at any time thereafter, issues command instructions programming the data processing system to allocate the amount of promotional funds that may be spent on particular classes of goods and services for each customer account file, which may be tailored to an individual customer's spending preferences. The allocation may also be designed to complement other casino promotions. Funds may be allocated for spending on food, lodging, entertainment, gaming, and the like. Within the amount of funds that are allocated for gaming, separate limits may be set for types of games, such as slot machines, black jack, and the like. Likewise, within the amount of funds that are allocated for food, separate limits may be set for meals and alcoholic beverages.

The casino data processing system is then programmed to evaluate each requested customer transaction to determine if available funds are allocated. If funds are available an approval signal is sent. If not a signal is sent disapproving the transaction. The system is also programmed to debit the allocated funds upon execution of each approved transaction, so that subsequent evaluations are made against a new, lower allocation.

A magnetic card encoded with an identifier correlated to the customer account file is then issued to the gambling customer. Card readers are positioned throughout the casino at locations providing goods and services for which funds are allocated, such as restaurants, bars, theaters, gift and retail shops, hotel registration desks, slot machines, gaming tables, and the like. The customer uses the card like any other debit card to purchase goods and services from the casino using the allocated funds.

The computer-based methods of the present invention do not require special or unique computer programming for operation. Instead, the system features described above can be programmed following conventional techniques by individuals of ordinary skill.

The system of the present invention is also extremely versatile because of its ready adaptability to existing banking networks. Such networks make it possible to set aside funds in a distant city for a third party recipient without regard for whether the bank of the account holder has branches in that city.

As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A system for allocating funds in pre-established customer accounts comprising:
   a controller processor programmed: (a) to process data, (b) to create for each customer a customer account file, and (c) to transfer funds from customer account files to transferees selected by said customers, in response to command instructions;
   an input device for supplying command instructions to said controller processor; and
   a data storage device associated with said controller processor in which file records of said customer account files created by said controller processor are stored, including information on the amounts of finds deposited for said customers;
   wherein said controller processor is programmed (a) to establish automatic periodic fund transfers of depositor funds to said account for use by said customer; (b) to process and store information in said storage device for each customer account, in response to command instruction from fund depositors, limiting the amount of funds that may be spent on particular classes of goods and services; and (c) to process fund transfer command instructions issued by said customers by determining whether the requested funds exceed the limit set for said goods or services to be purchased.

2. The system of claim 1, wherein said controller processor is programmed to complete said transfer when the requested funds do not exceed said limit.

3. The system of claim 1, wherein said controller processor is programmed to discontinue said transfer when the requested funds exceed said limit.

4. The system of claim 1, further comprising an output device, wherein said controller processor is programmed to store in the storage device information on each selected fund transferee and corresponding transfer amounts and to supply to said fund depositor through said output device said stored information on fund transferees and transfer amounts.

5. The system of claim 1, wherein said customer account file is a bank or credit account established in advance in the name of said customer by said fund depositor.

6. The system of claim 1, wherein said fund transferees include said customer.

7. The system of claim 1, wherein said goods or services comprise books, computer software food, lodging or entertainment.

8. A computer-based method for allocating funds in preestablished accounts for use by customers, comprising:
   creating for each customer a customer account file containing a record of funds deposited for said customer;
   automatically transferring periodically to said account file depositor funds for use by said customer;
   limiting the amount of funds in said customer account file that may be spent on particular classes of goods and services in response to command instructions from the fund depositor; and
   verifying each transfer from said customer account file requested by said customer to determine whether the requested funds exceed the limit set for the goods or services to be purchased.

9. The method of claim 8, wherein said method further comprises the step of completing said transfer when sufficient finds have been allocated.

10. The method of claim 8, wherein said method further comprises the step of discontinuing said transfer when insufficient funds have been allocated.

11. The method of claim 9, further comprising the step of storing information on fund transferees and corresponding payment amounts.

12. The method of claim 11, further comprising the step of supplying to said fund depositor said information on fund transferees and corresponding payment amounts.

13. The method of claim 12, wherein said supplying step is performed periodically.

14. The method of claim 13, wherein said step is performed weekly or monthly.

15. The method of claim 9, wherein said funds are deposited periodically.

16. The method of claim 15, wherein said funds are deposited weekly or monthly.

17. The method of claim 9, wherein said customer account file is a bank or credit account established in advance in the name of said customer by said fund depositor.

18. The method of claim 9, wherein said fund transferees include said customer.

19. The method of claim 9, wherein said goods or services comprise books, computer software, food, lodging or entertainment.

20. A system for allocating funds in pre-established customer accounts comprising:
   a controller processor programmed: (a) to process data, (b) to create for each customer a customer account file, and (c) to transfer funds from customer account files to transferees selected by said customers, in response to command instructions;
   an input device for supplying command instructions to said controller processor; and
   a data storage device associated with said controller processor in which file records of said customer account files created by said controller processor are stored, including information on the amounts of funds deposited for said customers;
   wherein said controller processor is programmed (a) to process and store information in said storage device for each customer account, in response to command instruction from fund depositors, setting periodic transaction limits for particular classes of goods and services; and (b) to process fund transfer command instructions issued by said customers by determining whether the requested funds exceed the transaction limit set for said goods or services to be purchased.

21. The system of claim 20, wherein said controller processor is programmed to complete said transfer when the requested funds do not exceed said limit.

22. The system of claim 20, wherein said controller processor is programmed to discontinue said transfer when the requested funds exceed said limit.

23. The system of claim 20, further comprising an output device, wherein said controller processor is programmed to store in the storage device information on each selected fund transferee and corresponding transfer amounts and to supply to said fund depositor through said output device said stored information on fund transferees and transfer amounts.

24. The system of claim 20, wherein said customer account file is a bank or credit account established in advance in the name of said customer by said fund depositor.

25. The system of claim 20, wherein said fund transferees include said customer.

26. The system of claim 20, wherein said goods or services comprise books, computer software, food, lodging or entertainment.

27. A computer-based method for allocating funds in preestablished accounts for use by customers, comprising:
   creating for each customer a customer account file containing a record of funds deposited for said customer;
   setting periodic transaction limits on the amount of funds in said customer account file that may be spent on particular classes of goods and services in response to command instructions from the fund depositor; and
   verifying each transfer from said customer account file requested by said customer to determine whether the requested funds exceed the transaction limit set for the goods or services to be purchased.

28. The method of claim 27, wherein said method further comprises the step of completing said transfer when sufficient funds have been allocated.

29. The method of claim 27, wherein said method further comprises the step of discontinuing said transfer when insufficient funds have been allocated.

30. The method of claim 29, further comprising the step of storing information on fund transferees and corresponding payment amounts.

31. The method of claim 30, further comprising the step of supplying to said fund depositor said information on fund transferees and corresponding payment amounts.

32. The method of claim 31, wherein said supplying step is performed periodically.

33. The method of claim 32, wherein said step is performed weekly or monthly.

34. The method of claim 28, wherein said funds are deposited periodically.

35. The method of claim 34, wherein said funds are deposited weekly or monthly.

36. The method of claim 28, wherein said customer account file is a bank or credit account established in advance in the name of said customer by said fund depositor.

37. The method of claim 28, wherein said find transferees include said customer.

38. The method of claim 28, wherein said goods or services comprise books, computer software, food, lodging or entertainment.

* * * * *